United States Patent
Chiang

(10) Patent No.: US 7,605,991 B2
(45) Date of Patent: Oct. 20, 2009

(54) LENS MODULE AND CAMERA MODULE HAVING SAME

(75) Inventor: Tsung-Wei Chiang, Taipei Hsien (TW)

(73) Assignee: Hon Hai Precision Industry Co., Ltd., Tu-cheng, Taipei Hsien (TW)

(*) Notice: Subject to any disclaimer, the term of this patent is extended or adjusted under 35 U.S.C. 154(b) by 0 days.

(21) Appl. No.: 11/776,888

(22) Filed: Jul. 12, 2007

(65) Prior Publication Data

US 2008/0266675 A1 Oct. 30, 2008

(30) Foreign Application Priority Data

Apr. 29, 2007 (CN) .................. 2007 1 0200567

(51) Int. Cl.
*G02B 7/02* (2006.01)
(52) U.S. Cl. .................. 359/811; 359/819; 359/823
(58) Field of Classification Search ......... 359/803–829, 359/686

See application file for complete search history.

(56) References Cited

U.S. PATENT DOCUMENTS

| 5,699,199 | A | * | 12/1997 | Cho et al. ................ 359/698 |
| 5,739,963 | A | * | 4/1998 | Kato ........................ 359/704 |
| 6,424,472 | B1 | * | 7/2002 | Chen ........................ 359/819 |
| 6,752,061 | B2 | * | 6/2004 | Knorich et al. ............ 89/14.05 |
| 7,236,305 | B2 | | 6/2007 | Yakita |
| 2004/0020352 | A1 | | 2/2004 | Knorich et al. |
| 2005/0141106 | A1 | * | 6/2005 | Lee et al. ................. 359/808 |
| 2005/0248684 | A1 | * | 11/2005 | Machida .................... 348/373 |
| 2006/0268429 | A1 | * | 11/2006 | Chang et al. .............. 359/698 |
| 2007/0171548 | A1 | * | 7/2007 | Kulakofsky et al. ....... 359/808 |
| 2007/0212050 | A1 | * | 9/2007 | Chiang ..................... 396/144 |

FOREIGN PATENT DOCUMENTS

JP 2003270507 * 9/2003

* cited by examiner

*Primary Examiner*—Ricky L Mack
*Assistant Examiner*—Vipin M Patel
(74) *Attorney, Agent, or Firm*—Clifford O. Chi

(57) ABSTRACT

A lens module includes a first lens assembly, a first lens barrel, a second lens assembly, a second lens barrel having a bottom with a through hole, an elastic member and a holder receiving the first lens barrel and the elastic member therein. The first lens barrel has one of guiding protrusions and guiding grooves, and the holder has the other one of the guiding protrusions and the guiding grooves, the guiding protrusions being adapted for sliding in the guiding grooves. The first lens barrel has one of sloping portions and protrusions on an end facing toward the second lens barrel, and the second lens barrel has the other one of the sloping portions and the protrusions therein, the second lens barrel is threadedly movable relative to the holder, whereby the protrusions slide on the sloping portions such that the first lens barrel is forced to move.

17 Claims, 5 Drawing Sheets

LENS MODULE AND CAMERA MODULE HAVING SAME

BACKGROUND

1. Technical Field

The present invention relates to lens modules, and particularly to a lens module with a zoom mechanism therein, and a camera module having the lens module.

2. Description of Related Art

Increasing numbers of portable electronic devices are incorporating camera modules such as still camera modules and digital camera modules into their construction. Such camera modules should be cheap and have excellent optical performance.

A camera module of the related art includes at least one lens module and an image sensor module in alignment with the at least one lens module. The at least one lens module typically includes a lens barrel and lenses assembled in the lens barrel. Recent lens modules widely integrate zoom mechanisms therein, such as step motors for driving the lenses to move relative to each other, thereby achieving the zoom function. However, the step motor is relatively bulky in volume. In addition, the step motor consumes a substantial amount of power, especially relative to the amount of power that can be stored in a typical battery system of a camera or an electronic device.

What is needed, therefore, is a lens module which has a simple and energy-efficient zoom mechanism.

What is also needed, is a camera module using the lens module.

SUMMARY

In a preferred embodiment, an exemplary lens module includes a first lens assembly including at least one first lens, a first lens barrel receiving the first lens assembly therein, a second lens assembly including at least one second lens, a second lens barrel receiving the second lens assembly therein, an elastic member and a hollow holder. The second lens barrel has a bottom with a through hole, and an inner thread. The elastic member elastically presses the first lens barrel toward the second lens barrel. The hollow holder receives the first lens barrel and the elastic member therein, and has an outer thread, the second lens barrel being threadedly engaged with the holder. The first lens barrel has one of at least one straight, elongate guiding protrusion and at least one straight guiding groove on an outer wall thereof, and the holder has the other one of the at least one straight, elongate guiding protrusion and the at least one straight guiding groove in an inner wall thereof, the at least one guiding protrusion being adapted for sliding in the at least one guiding groove. The first lens barrel has one of at least one sloping portion and at least one protrusion on an end face facing toward the bottom of the second lens barrel, and the second lens barrel has the other one of the at least one sloping portion and the at least one protrusion on the bottom thereof. The second lens barrel is threadedly movable relative to the holder, whereby the at least one protrusion slides on the at least one sloping portion such that the first lens barrel is forced to move relative to the second lens barrel, with movement of the first lens barrel together with the first lens assembly along a central axis of the lens module simultaneously accompanying movement of the second lens barrel together with the second lens assembly alone the central axis of the lens module.

In another preferred embodiment, an exemplary camera module includes a first lens assembly including at least one first lens, a first lens barrel receiving the first lens assembly therein, a second lens assembly including at least one second lens, a second lens barrel receiving the second lens assembly therein, an elastic member, a hollow holder and an image sensor. The second lens barrel has a bottom with a through hole, and an inner thread. The elastic member elastically presses the first lens barrel toward the second lens barrel. The hollow holder receives the first lens barrel and the elastic member therein, and has an outer thread, the second lens barrel being threadedly engaged with the holder. The first lens barrel has one of at least one straight, elongate guiding protrusion and at least one straight guiding groove on an outer wall thereof, and the bolder has the other one of the at least one straight, elongate guiding protrusion and the at least one straight guiding groove in an inner wall thereof, the at least one guiding protrusion being adapted for sliding in the at least one guiding groove. The first lens barrel has one of at least one sloping portion and at least one protrusion on an end face facing toward the bottom of the second lens barrel, and the second lens barrel has the other one of the at least one sloping portion and the at least one protrusion on the bottom thereof. The second lens barrel is threadedly movable relative to the holder, whereby the at least one protrusion slides on the at least one sloping portion such that the first lens barrel is forced to move relative to the second lens barrel, with movement of the first lens barrel together with the first lens assembly along a central axis of the lens module simultaneously accompanying movement of the second lens barrel together with the second lens assembly along the central axis of the lens module. The image sensor is configured for detecting light from the first and second lens assemblies.

Other advantages and novel features of the present invention will become more apparent from the following detailed description of preferred embodiment when taken in conjunction with the accompanying drawings.

BRIEF DESCRIPTION OF THE DRAWINGS

Many aspects of the lens module and camera module can be better understood with reference to the following drawings. The components in the drawing are not necessarily drawn to scale, the emphasis instead being placed upon clearly illustrating the principles of the present lens module and camera module. Moreover, in the drawings, like reference numerals designate corresponding parts throughout the several views.

DETAILED DESCRIPTION OF THE PREFERRED EMBODIMENTS

Embodiments of the present lens module and camera module will now be described in detail below and with reference to the drawings.

Figure 1:
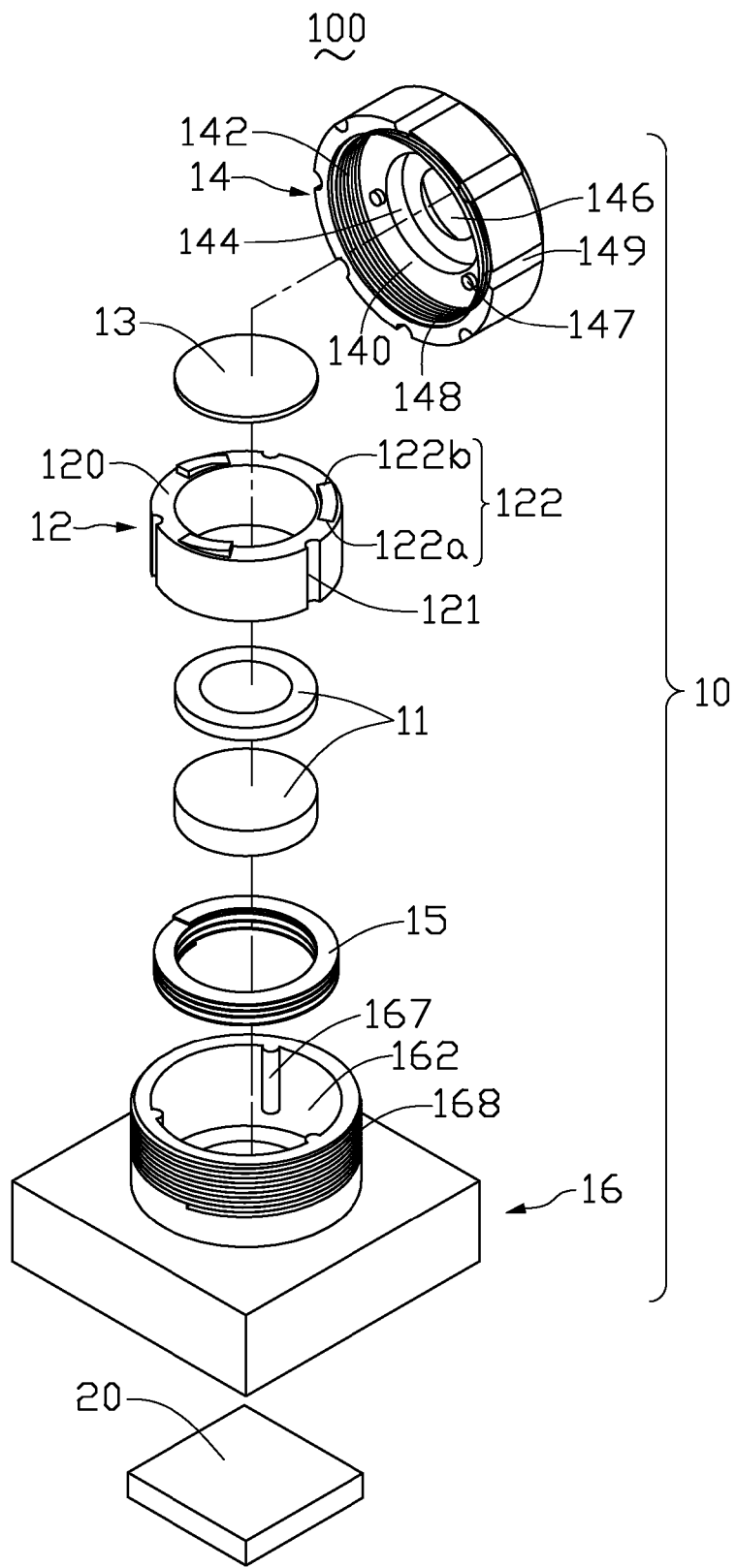
FIG. 1 is an exploded view of a camera module according to a first preferred embodiment of the present invention.
Figure 2:
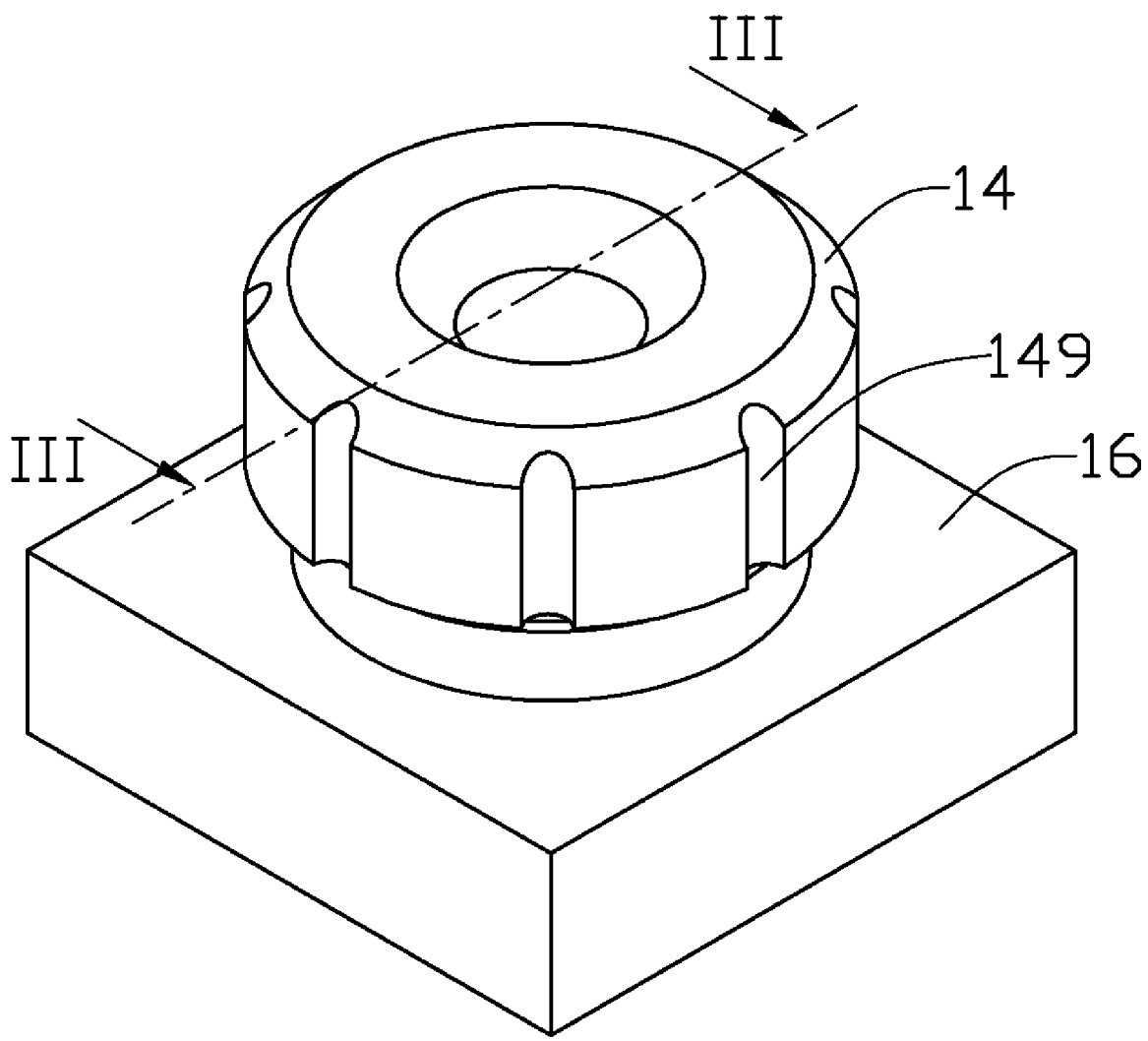
FIG. 2 is an assembled view of the camera module shown in FIG. 1.
Figure 3:
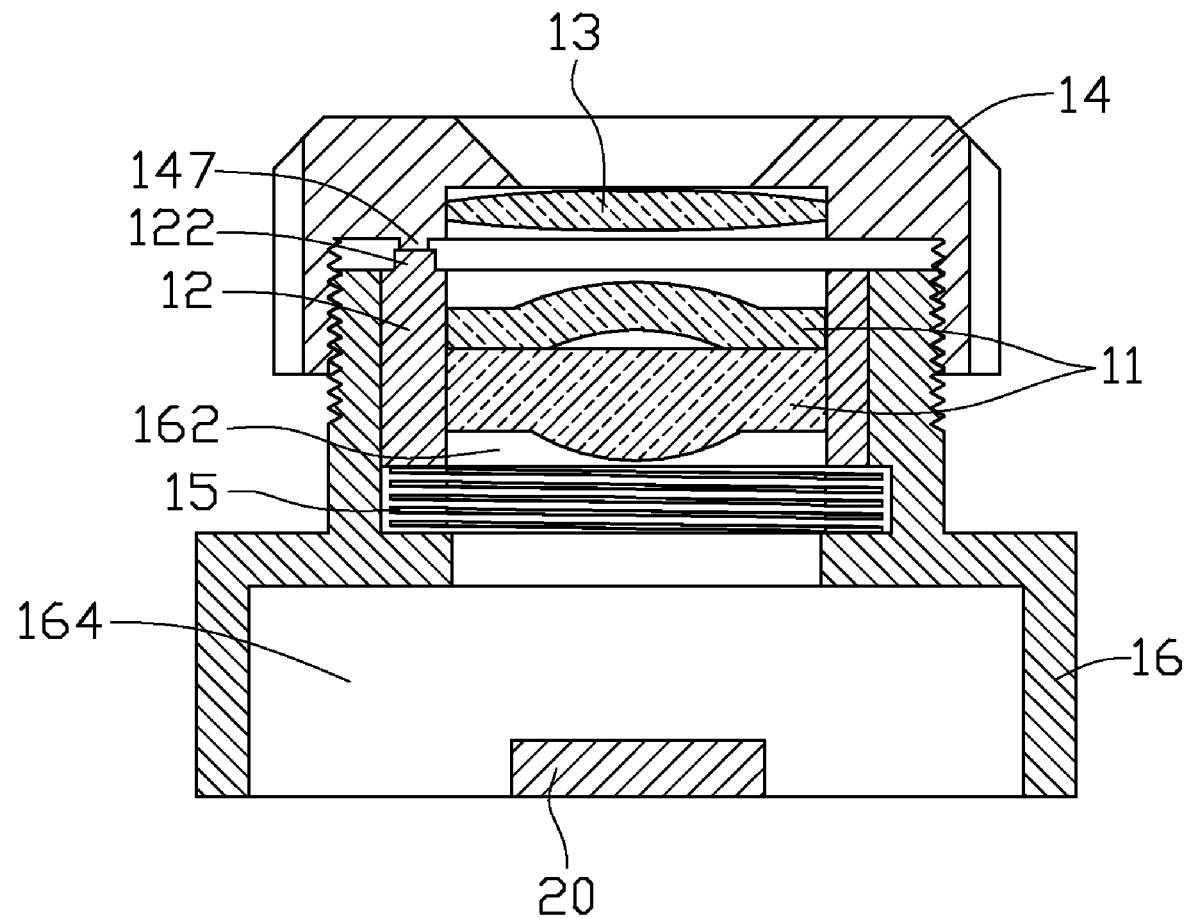
FIG. 3 is a cross-sectional view taken along line III-III of the camera module shown in FIG. 2.

Referring to FIGS. 1 and 2, an exemplary camera module 100 includes a lens module 10 and an image sensor 20 in alignment with the lens module 10.

The lens module 10 includes a first lens assembly 11, a first lens barrel 12 receiving the first lens assembly 11 therein, a second lens assembly 13, a second lens barrel 14 receiving the second assembly 13 therein, a ring-shaped elastic member 15 and a hollow holder 16.

The first lens assembly 11 includes two first lenses, and the second lens assembly 13 includes one second lens. The lenses of the first and second lens assemblies 11, 13 each can be made of plastic or glass, and can be spherical or aspherical in shape. The first lens barrel 12 has three evenly spaced guiding grooves 121 on an outer wall thereof, and three evenly spaced sloping portions 122 on an end 120 thereof. The guiding grooves 121 each extend along a direction parallel to a central axis of the first lens barrel 12. The three sloping portions 122 each are in a sloping ridge shape, and each define a lower end 122a and a higher end 122b continuously sloping toward the lower end 122a. The second lens barrel 14 includes an opening 142 having a bottom 140, a lens receiving space 144 being in communication with the opening 142 and having a through hole 146. An inner thread 148 is defined in the inner wall of the opening 142. The bottom 140 has three evenly spaced protrusions 147 thereon, and the three protrusions 147 each have a pin shape. The lens receiving space 144 receives the second lens assembly 13 therein. The through hole 146 is configured for receiving light from outside. the second lens barrel 14 further includes a number of finger grooves 149 on an outer wall thereof.

The hollow holder 16 includes a cylinder portion 162 and a frame portion 164 in communication with the cylinder portion 162. The cylinder portion 162 has three evenly spaced guiding protrusions 167 in an inner wall thereof, and an outer thread 168 on an outer wall thereof. The cylinder portion 162 receives the elastic member 15 and subsequently the first lens barrel 12 therein. The three guiding protrusions 167 engage in the respective three guiding grooves 121 of the first lens barrel 12. The second lens barrel 14 is disposed above the first lens barrel 12 with the three protrusions 147 thereof abutting on the respective three sloping portions 122 of the first lens barrel 12 and the inner thread 148 thereof engaging with the outer thread 168 of the holder 16.

The image sensor 22 is selected from a charge coupled device (CCD for short) or a complementary metal oxide semiconductor transistor (CMOS for short). The image sensor 22 is received within the frame portion 164 of the holder 16 and configured for detecting light from the first and second lens assemblies 11,13.

When the user's fingers engage in the finger grooves 149 of the second Lens barrel 14 and rotate the second lens barrel 14, the three protrusions 147 of the second lens barrel 14 will move along the respective three sloping portions 122 of the first lens barrel 12, thus moving the first lens barrel 12 upwards or downwards, with the elastic member 15 thereby being compressed or released during such movement. Due to the engagement of the guiding protrusions 167 in the guiding grooves 124 of the first lens barrel 12, the first lens barrel 12 can avoid rotating during the movement. The second lens barrel 14 can be rotated in a reverse direction, and the three protrusions 147 each move between two of the sloping portions 122 of the first lens barrel 12 thereby achieving zoom function.

A height of each of the three sloping portions 122 of the first lens barrel 12, and a moving distance according a rotating circuit of the second lens 14, can each be designed according to zoom requirements.

It is understood that the three sloping portions 122 can be integrated together, i.e., the three sloping portions 122 have no space therebetween. Alternatively, the first lens barrel 12 can have only one sloping portion 122, and the second lens barrel 14 can have only one protrusion 147.

Furthermore, the three guiding protrusions 167 and the three guiding grooves 121 can be exchanged with each other. Moreover, only one guiding protrusion 167 and only one guiding groove 121 are required to prevent the first lens barrel 12 rotating during the above-described movement.

Figure 4:
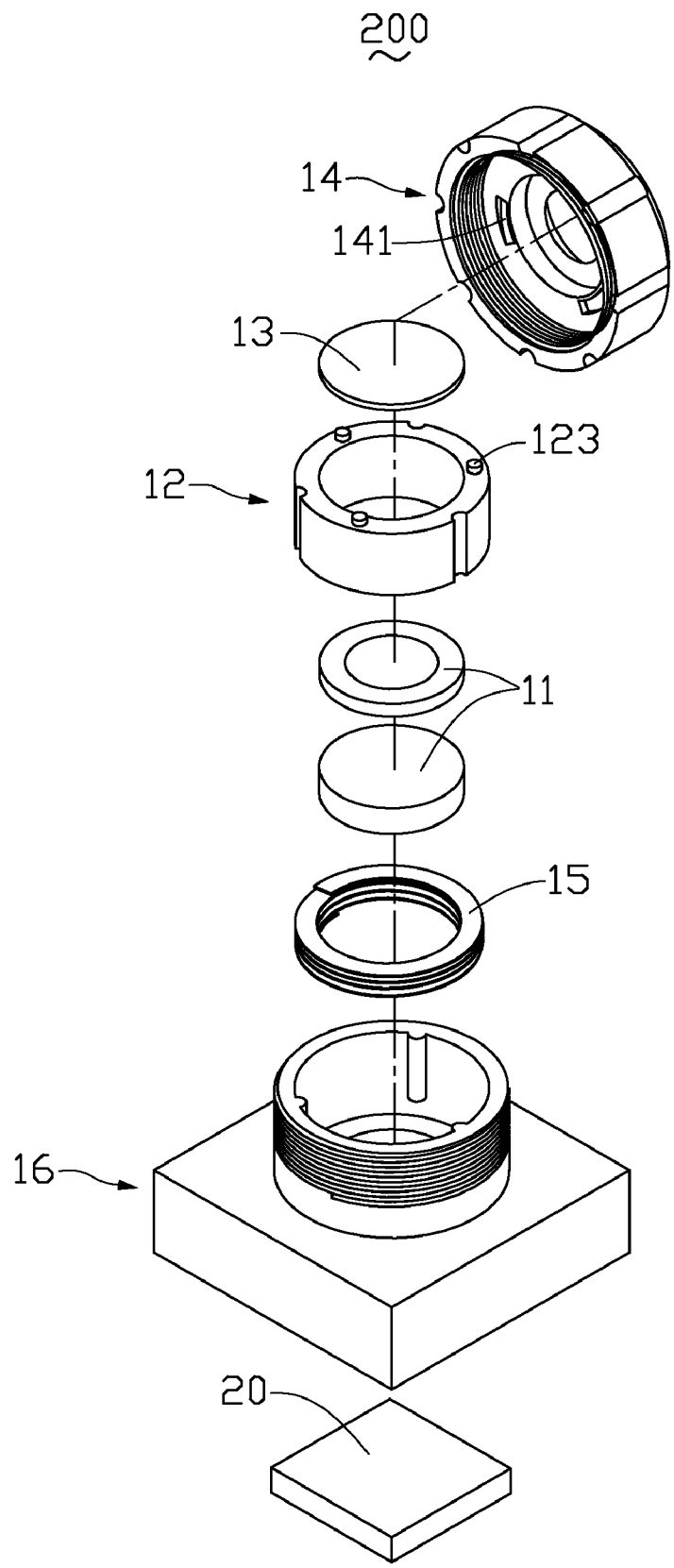
FIG. 4 is an exploded view of a camera module according to a second preferred embodiment of the present invention.

FIG. 4 shows an exploded view of a camera module 200 according to a second preferred embodiment of the present invention. The camera module 200 is essentially similar to the camera module 100 illustrated in the first preferred embodiment, however, the first lens barrel 12 has three pin shaped protrusions 123 on the end 120 thereof, and the second lens barrel 14 has three sloping portions 141 therein, the three sloping portions 141 each being in a sloping groove shape.

Figure 5:
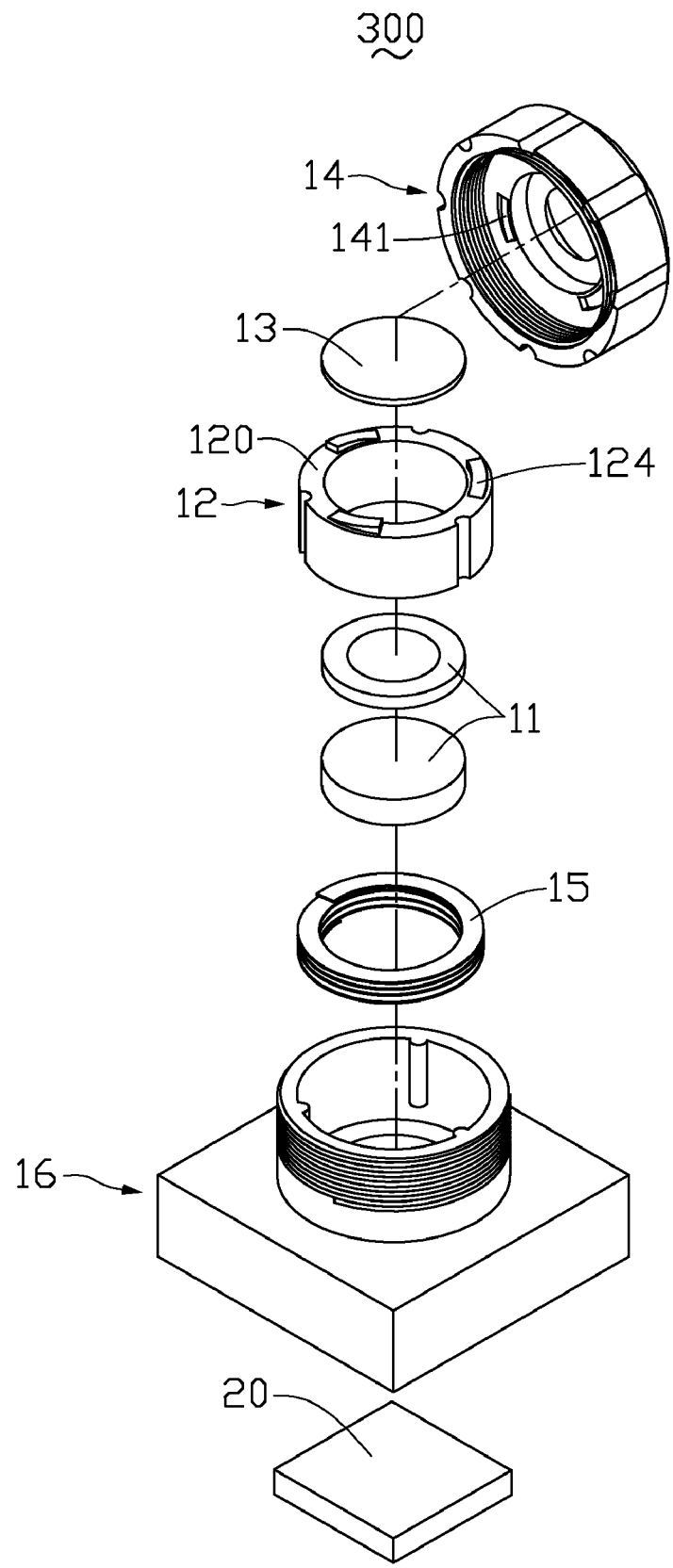
FIG. 5 is an exploded view of a camera module according to a third preferred embodiment of the present invention.

FIG. 5 shows an exploded view of a camera module 300 according to a second preferred embodiment of the present invention. The camera module 300 is essentially similar to the camera module 100 illustrated in the first preferred embodiment, however, the first lens barrel 12 has three ridge shaped protrusions 124 on the end 120 thereof, and the second lens barrel 14 has three groove shaped sloping portions 141 therein.

It is understood that the above-described embodiments are intended to illustrate rather than limit the invention. Variations may be made to the embodiments and methods without departing from the spirit of the invention. Accordingly, it is appropriate that the appended claims be construed broadly and in a manner consistent with the scope of the invention.

What is claimed is:

1. A lens module comprising:
a first lens assembly including at least one first lens;
a first lens barrel receiving the first lens assembly therein;
a second lens assembly including at least one second lens;
a second lens barrel receiving the second lens assembly therein, the second lens barrel having a bottom with a through hole, and an inner thread;
an elastic member elastically pressing the first lens barrel toward the second lens barrel; and
a hollow holder receiving the elastic member and the first lens barrel therein, the holder having an outer thread, the second lens barrel being threadedly engaged with the holder;
wherein, the first lens barrel has one of at least one straight, elongate guiding protrusion and at least one straight guiding groove on an outer wall thereof, and the holder has the other one of the at least one straight, elongate guiding protrusion and the at least one straight guiding groove in an inner wall thereof, the at least one guiding protrusion and the at least one guiding groove each extending along a direction parallel to a central axis of the first lens barrel, the at least one guiding protrusion being adapted for sliding in the at least one guiding groove; and
wherein, the first lens barrel has one of at least one sloping portion and at least one sliding protrusion on an end face thereof facing toward the bottom of the second lens barrel, the second lens barrel has the other one of the at least one sloping portion and the at least one sliding protrusion on the bottom thereof, and the second lens barrel is threadedly movable relative to the holder, whereby the at least one sliding protrusion slides on the at least one sloping portion such that the first lens barrel together with the first lens assembly is forced to move relative to the second lens barrel together with the second lens assembly, movement of the first lens barrel together with the first lens assembly along a central axis of the lens module simultaneously accompanying movement of the second lens barrel together with the second lens assembly along the central axis of the lens module.

2. The lens module as described in claim 1, wherein the at least one guiding groove comprises three guiding grooves, and the at least one guiding protrusion comprises three guiding protrusions, the three guiding grooves and the three guiding protrusions respectively being evenly spaced.

3. The lens module as described in claim 1, wherein the at least one sloping portion is in one of a sloping ridge shape and a sloping groove shape, and the at least one sliding protrusion is in a pin shape.

4. The lens module as described in claim 1, wherein the at least one sloping portion is a sloping groove in shape, and the at least one sliding protrusion is a sloping ridge in shape.

5. The lens module as described in claim 1, wherein the at least one sloping portion comprises three sloping portions, and the at least one sliding protrusion comprises three sliding protrusions, the three sloping portions and the three sliding protrusions respectively being evenly spaced, the three sloping portions each gradually ascending along a same direction of a circular path of the respective end face of the first lens barrel or the bottom of the second lens barrel.

6. The lens module as described in claim 5, wherein the three sloping portions each gradually ascend along a counterclockwise direction of the circular path.

7. The lens module as described in claim 1, wherein the elastic member is ring-shaped, the holder has a retaining portion retaining the elastic member thereon, and the first lens barrel is disposed on the elastic member.

8. The lens module as described in claim 1, wherein the second lens barrel has a plurality of finger grooves on an outer wall thereof for facilitating rotating the second lens barrel relative to the holder.

9. A camera module comprising:
a lens module and an image sensor, the lens module comprising:
a first lens assembly including at least one first lens;
a first lens barrel receiving the first lens assembly therein;
a second lens assembly including at least one second lens;
a second lens barrel receiving the second lens assembly therein, the second lens barrel having a bottom with a through hole, and an inner thread;
an elastic member elastically pressing the first lens barrel toward the second lens barrel; and
a hollow holder receiving the elastic member and the first lens barrel therein, the holder having an outer thread, the second tens barrel being threadedly engaged with the holder;
wherein, the image sensor is configured for detecting light from the first and second lens assemblies; and
wherein, the first lens barrel has one of at least one straight, elongate guiding protrusion and at least one straight guiding groove on an outer wall thereof, and the holder has the other one of the at least one straight, elongate guiding protrusion and the at least one straight guiding groove in an inner wall thereof, the at least one guiding protrusion and the at least one guiding groove each extending along a direction parallel to a central axis of the first lens barrel, the at least one guiding protrusion being adapted for sliding in the at least one guiding groove; and wherein, the first lens barrel has one of at least one sloping portion and, at least one sliding protrusion on an end face thereof facing toward the bottom of the second lens barrel, the second lens barrel has the other one of the at least one sloping portion and the at least one sliding protrusion on the bottom thereof, and the second lens barrel is threadedly movable relative to the holder, whereby the at least one sliding protrusion slides on the at least one sloping portion such that the first lens barrel together with the first lens assembly is forced to move relative to the second lens barrel together with the second lens assembly, movement of the first lens barrel together with the first lens assembly along a central axis of the lens module simultaneously accompanying movement of the second lens barrel together with the second lens assembly along the central axis of the lens module.

10. The camera module as described in claim 9, wherein the at least one guiding groove comprises three guiding grooves, and the at least one guiding protrusion comprises three guiding protrusions, the three guiding grooves and the three guiding protrusions respectively being evenly spaced.

11. The camera module as described in claim 9, wherein the at least one sloping portion is in one of a sloping ridge shape and a sloping groove shape, and the at least one sliding protrusion is in a pin shape.

12. The camera module as described in claim 9, wherein the at least one sloping portion is a sloping groove in shape, and the at least one sliding protrusion is a sloping ridge in shape.

13. The camera module as described in claim 9, wherein the hollow holder includes a cylinder portion receiving the elastic member and the first lens barrel therein and a frame portion receiving the image sensor therein and in communication with the cylinder portion, the second lens barrel being threadedly engaged with the cylinder portion.

14. The lens module as described in claim 9, wherein the at least one sloping portion comprises three sloping portions, and the at least one sliding protrusion comprises three sliding protrusions, the three sloping portions and the three sliding protrusions respectively being evenly spaced, the three sloping portions each gradually ascending along a same direction of a circular path of the respective end face of the first lens barrel or the bottom of the second lens barrel.

15. The lens module as described in claim 14, wherein the three sloping portions each gradually ascend along a counterclockwise direction of the circular path.

16. The camera module as described in claim 9, wherein the elastic member is ring-shaped, the holder has a retaining portion retaining the elastic member thereon, and the first lens barrel is disposed on the elastic member.

17. The camera module as described in claim 9, wherein the second lens barrel has a plurality of finger grooves on an outer wall thereof for facilitating rotating the second lens barrel relative to the holder.

* * * * *